United States Patent
Casper et al.

(10) Patent No.: US 8,413,739 B2
(45) Date of Patent: Apr. 9, 2013

(54) AGRICULTURAL IMPLEMENT STANDARD MOUNT

(75) Inventors: Robert T. Casper, Ankeny, IA (US);
Daniel P. Bruns, Ankeny, IA (US);
Roderic A. Healy, W Des Moines, IA (US); Richard J. Connell, Slater, IA (US); Mark D. Beeck, Ankeny, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 13/214,581

(22) Filed: Aug. 22, 2011

(65) Prior Publication Data
US 2013/0048324 A1 Feb. 28, 2013

(51) Int. Cl.
*A01B 63/02* (2006.01)

(52) U.S. Cl.
USPC ............................ 172/673; 172/699; 172/572

(58) Field of Classification Search .................. 172/574, 172/572, 573, 708, 763, 451, 669, 508, 558, 172/673; 403/92, 81
See application file for complete search history.

(56) References Cited

U.S. PATENT DOCUMENTS

| | | | | | |
|---|---|---|---|---|---|
| 905,786 | A | * | 12/1908 | Biesenthal | 172/561 |
| 1,957,991 | A | * | 5/1934 | Bloodworth | 172/739 |
| 2,430,434 | A | * | 11/1947 | Rutter | 403/92 |
| 2,637,262 | A | * | 5/1953 | Altgelt | 403/108 |
| 2,821,796 | A | * | 2/1958 | Forte | 172/778 |
| 2,876,852 | A | * | 3/1959 | Kenney | 172/142 |
| 4,210,212 | A | * | 7/1980 | Jackson et al. | 172/645 |
| 4,407,372 | A | * | 10/1983 | Rozeboom | 172/572 |
| 4,759,411 | A | * | 7/1988 | Williamson | 172/572 |
| 4,834,189 | A | * | 5/1989 | Peterson et al. | 172/166 |
| 4,928,774 | A | * | 5/1990 | Bell | 172/430 |
| 5,042,590 | A | * | 8/1991 | Bierl et al. | 172/572 |
| 5,181,573 | A | * | 1/1993 | Almen | 172/459 |
| 5,267,619 | A | * | 12/1993 | Eversole | 172/572 |
| 5,497,716 | A | * | 3/1996 | Shoup | 111/140 |
| 5,626,196 | A | * | 5/1997 | Hughes | 172/558 |
| 5,743,341 | A | * | 4/1998 | Wattonville | 172/451 |
| 6,068,061 | A | * | 5/2000 | Smith et al. | 172/139 |
| 6,505,688 | B1 | | 1/2003 | Almen | |
| 6,698,525 | B2 | | 3/2004 | McFarlane | |
| RE38,974 | E | * | 2/2006 | Gengler et al. | 172/574 |
| 7,131,501 | B1 | * | 11/2006 | Svendsen et al. | 172/601 |
| 7,631,701 | B2 | | 12/2009 | Kromminga et al. | |
| 7,762,345 | B2 | | 7/2010 | Rozendaal et al. | |

* cited by examiner

*Primary Examiner* — Arpad Fabian-Kovacs

(57) ABSTRACT

An agricultural implement including a coupling mechanism for coupling to a vehicle and a frame having a tool tube with a top, which is coupled to the coupling mechanism. The frame is adapted to be pulled by the vehicle. The agricultural implement includes a plurality of wheel assemblies coupled to the frame, which support the frame above a surface. The agricultural implement includes a tool tube bracket coupled to the tool tube. The agricultural implement includes a standard having a mounting portion and a tool-receiving portion. The mounting portion is coupled to the tool tube bracket for translational adjustment of a position of the standard relative to the tool tube. The agricultural implement includes a tool coupled to the tool-receiving portion of the standard.

20 Claims, 2 Drawing Sheets

AGRICULTURAL IMPLEMENT STANDARD MOUNT

FIELD OF THE DISCLOSURE

The present disclosure generally relates to agricultural implements for conditioning soil, and more particularly to adjustable standard mounts for agricultural implements.

BACKGROUND OF THE DISCLOSURE

In order to mount a standard to an agricultural implement, agricultural implements commonly include two square u-bolts. The square u-bolts mount over a top of a gang tube of a frame of the agricultural implement.

Each square u-bolt then passes through a first bracket, beside the standard, and through a second bracket having an underside. The square u-bolts are secured to the underside of the second bracket with nuts. This embodiment is used on the Landoll® 6230 Disc and on the Sunflower® 1212 Disc.

Alternatively, each square u-bolt mounts over the top of the gang tube and passes through a hole in the standard. The square u-bolts are secured with at least one nut. This embodiment is used on the John Deere® 2410 Chisel Plow.

SUMMARY OF THE DISCLOSURE

In one embodiment, an agricultural implement includes a coupling mechanism for coupling to a vehicle. The agricultural implement includes a frame having a tool tube with a top. The frame is coupled to the coupling mechanism and extends from the coupling mechanism. The frame is adapted to be pulled by the vehicle in a direction of travel. The agricultural implement includes a plurality of wheel assemblies coupled to the frame. The wheel assemblies support the frame above a surface. The agricultural implement includes a tool tube bracket having an adjustment feature. The tool tube bracket is coupled to the tool tube without extending over the top and the top of the tool tube, above the tool tube bracket, is exposed. The agricultural implement includes a standard having a mounting portion and a tool-receiving portion. The mounting portion is coupled to the adjustment feature for translational adjustment of a position of the standard relative to the tool tube. The agricultural implement includes a tool coupled to the tool-receiving portion of the standard.

In another embodiment, an agricultural implement includes a coupling mechanism for coupling to a vehicle. The agricultural implement includes a frame having a tool tube with a top that is coupled to the coupling mechanism and extends from the coupling mechanism. The frame is adapted to be pulled by the vehicle in a direction of travel. The agricultural implement includes a plurality of wheel assemblies coupled to the frame. The wheel assemblies support the frame above a surface. The agricultural implement includes a tool tube bracket having an elongated slot. The tool tube bracket is coupled to the tool tube wherein the top of the tool tube, above the tool tube bracket, is exposed. The agricultural implement includes a standard having a mounting portion and a tool-receiving portion. The mounting portion is coupled to the elongated slot for translational adjustment of a position of the standard relative to the tool tube. The agricultural implement includes a tool coupled to the tool-receiving portion of the standard.

In yet another embodiment, an agricultural implement includes a coupling mechanism for coupling to a vehicle. The agricultural implement includes a frame having a tool tube with a top that is coupled to the coupling mechanism and extends from the coupling mechanism. The frame is adapted to be pulled by the vehicle in a direction of travel. The agricultural implement includes a plurality of wheel assemblies coupled to the frame. The wheel assemblies support the frame above a surface. The agricultural implement includes a tool tube bracket having a first elongated slot and a second elongated slot. The tool tube bracket is coupled to the tool tube wherein the top of the tool tube, above the tool tube bracket, is exposed. The agricultural implement includes a disk gang assembly and fasteners. The agricultural implement includes a standard having a mounting portion and a tool-receiving portion. The disk gang assembly is coupled to the tool receiving portion. The mounting portion is coupled to the first elongated slot with a first fastener of the fasteners and the second elongated slot with a second fastener of the fasteners.

Other features and aspects will become apparent by consideration of the detailed description and accompanying drawings.

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways.

DETAILED DESCRIPTION

Figure 1:
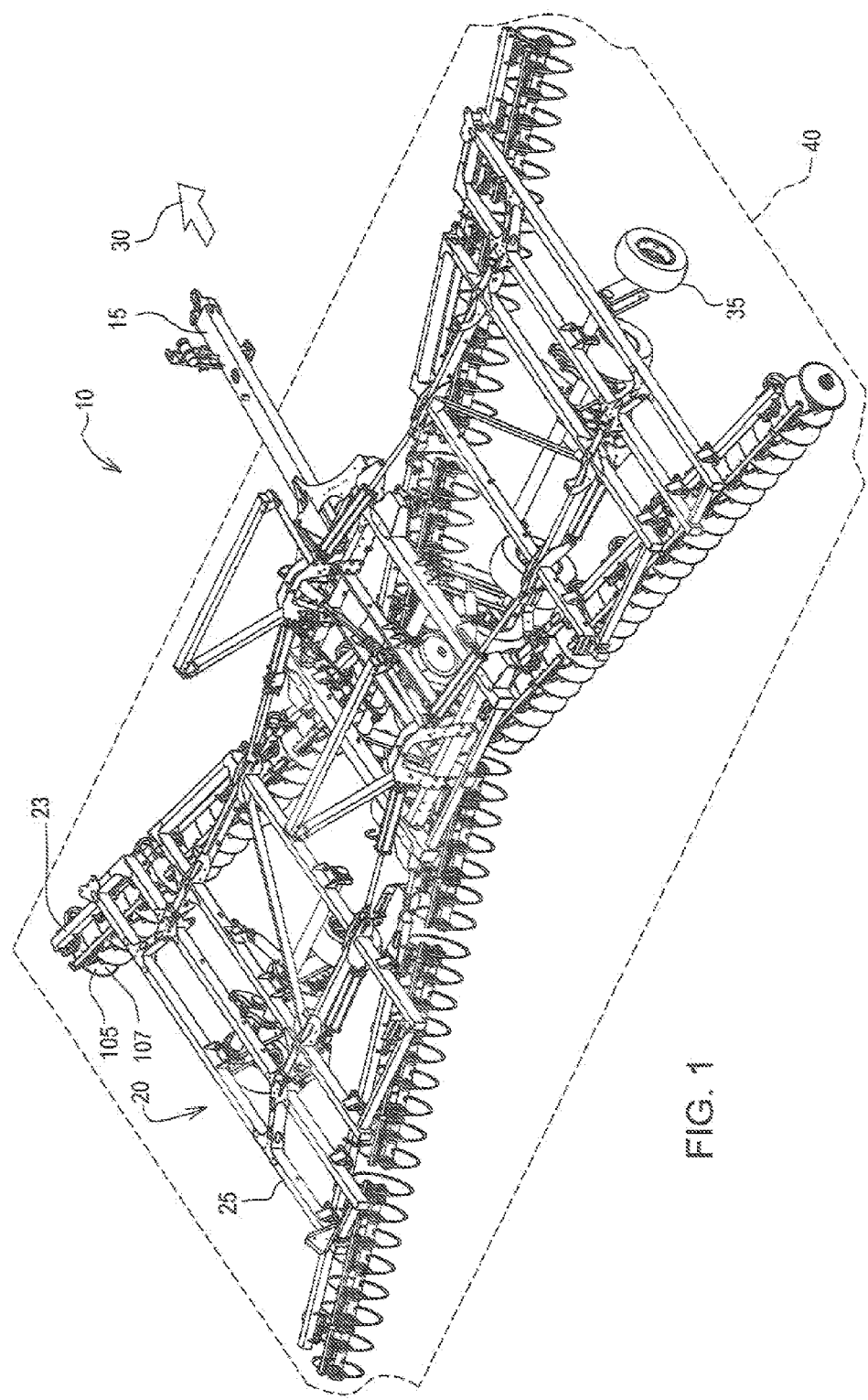
FIG. 1 is a perspective view of an agricultural implement according to one embodiment.
Figure 2:
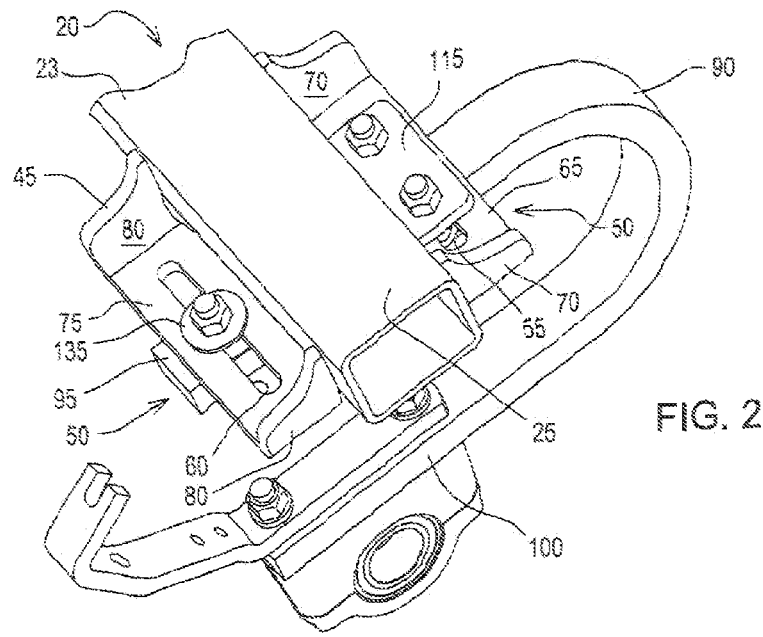
FIG. 2 is a top perspective view of a portion of the agricultural implement shown in FIG. 1.
Figure 3:
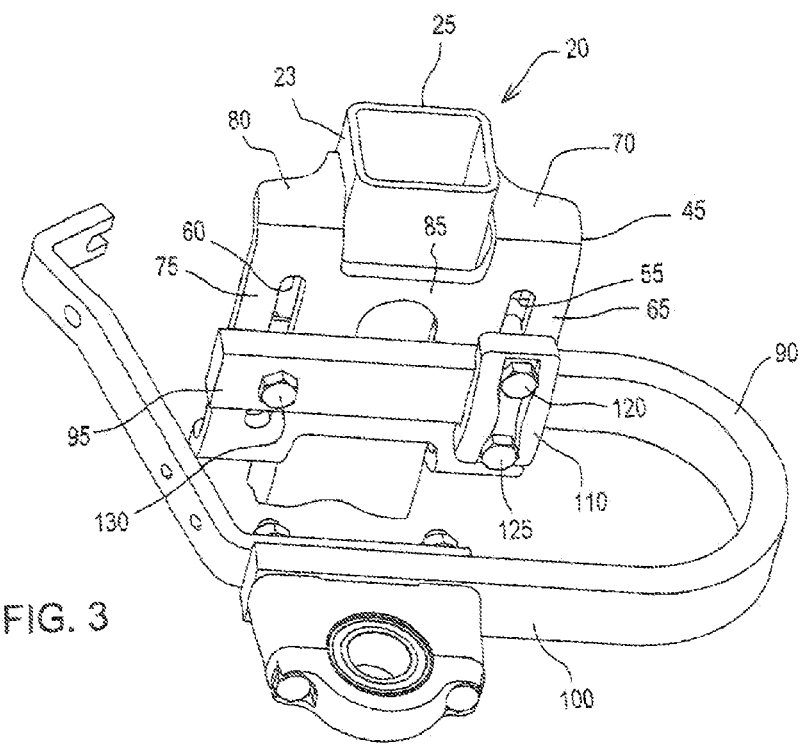
FIG. 3 is a bottom perspective view of the agricultural implement shown in FIG. 2.

FIGS. 1-3 illustrate an agricultural implement 10. Referring to FIG. 1, the illustrated agricultural implement 10 includes a coupling mechanism 15 for coupling to a vehicle (not shown).

A frame 20 having a plurality of tool tubes 23, each with a top 25, is coupled to the coupling mechanism 15. The frame 20 extends rearwardly from the coupling mechanism 15 in a direction opposite of a direction of travel 30.

A plurality of wheel assemblies 35 are coupled to the frame 20. The wheel assemblies 35 support the frame 20 above a surface 40.

Referring to FIGS. 2 and 3, a plurality of tool tube brackets 45 are coupled to each tool tube 23. Each tool tube bracket 45 is coupled to the tool tube 23 without extending over the top 25 and the top 25 of the tool tube 23, above the tool tube bracket 45, is exposed such that no plates, fasteners, or other structure extends over the top 25. The tool tube bracket 45 may be welded to the tool tube 23 or attached with fasteners. Welding enables a more rigid attachment method.

A standard 90 having a mounting portion 95, a tool-receiving portion 100, and an aperture (not shown) is coupled to the tool tube bracket 45. The tool-receiving portion 100 of the standard 90 is coupled to a tool 105 (FIG. 1). The tool 105 may be a disk gang assembly 107.

Each tool tube bracket 45 has an adjustment feature 50. The mounting portion 95 of the standard 90 is coupled to the adjustment feature 50, which is configured for translational adjustment of a position of the standard 90 relative to the tool tube 23. Such translational adjustment is, for example, a lateral adjustment of the position of the standard 90 relative to the direction of travel 30.

The adjustment feature 50 of the tool tube bracket 45 includes a first elongated slot 55 and a second elongated slot 60. The adjustment feature 50 may include greater than or less than two slots.

The tool tube bracket 45 may be H-shaped such that the tool tube bracket 45 includes a first side portion 65 having a first pair of upwardly-directed opposing flanges 70. The first side portion 65 includes the first elongated slot 55. The tool tube bracket 45 also includes a second side portion 75 having a second pair of upwardly-directed opposing flanges 80. The second side portion 75 includes the second elongated slot 60. Referring to FIG. 3, the tool tube bracket 45 further includes a connecting portion 85 that connects the first side portion 65 to the second side portion 75. The tool tube 23 of the frame 20 is positioned between the first pair of upwardly-directed opposing flanges 70 and the second pair of upwardly-directed opposing flanges 80. The tool tube 23 may be welded to the first and second pairs of upwardly-directed opposing flanges 70, 80.

Referring to FIGS. 2 and 3, a first standard bracket 110 is coupled to the mounting portion 95 of the standard 90 opposite the tool tube bracket 45. The first standard bracket 110 may be substantially rectangular or substantially triangular. The standard bracket 110 that is substantially rectangular allows for fine adjustments. A second standard bracket 115 is coupled to the first elongated slot 55 of the first side portion 65 opposite the mounting portion 95 of the standard 90.

A first fastener 120 and a second fastener 125 pass through the first standard bracket 110, beside the standard 90, through the first elongated slot 55, and through the second standard bracket 115 such that the first fastener 120 and the second fastener 125 are each in sliding engagement with the first elongated slot 55 when the first and second fasteners 120, 125 are loosened. The first and second fasteners 120, 125 are re-positionable in the first elongated slot 55 lengthwise thereof or laterally relative to the direction of travel 30.

A third fastener 130 passes through the aperture of the standard 90, through the second elongated slot 60, and through a washer 135 such that the third fastener 130 is in sliding engagement with the second elongated slot 60 when the third fastener 130 is loosened. The third fastener 130 is re-positionable in the second elongated slot 60 lengthwise thereof or laterally relative to the direction of travel 30. Alternatively, the third fastener 130 may first pass through the first standard bracket 110 or the third fastener 130 may pass through the aperture of the standard 90, through the tool tube bracket 45, and through a washer 135.

Various features are set forth in the following claims.

What is claimed is:

1. An agricultural implement comprising:
   a coupling mechanism for coupling to a vehicle;
   a frame comprising a tool tube, the tool tube comprising a top, the frame coupled to the coupling mechanism and extending from the coupling mechanism and adapted to be pulled by the vehicle in a direction of travel;
   a plurality of wheel assemblies coupled to the frame, the wheel assemblies supporting the frame above a surface;
   a tool tube bracket comprising an adjustment feature, the tool tube bracket coupled to the tool tube;
   a standard comprising a mounting portion and a tool-receiving portion, the mounting portion coupled to the adjustment feature configured for translational adjustment of a position of the standard relative to the tool tube; and
   a tool coupled to the tool-receiving portion of the standard;
   wherein the tool tube bracket is coupled to the tool tube without extending over the top and the top of the tool tube, above the tool tube bracket, is exposed.

2. The agricultural implement of claim 1, wherein the tool tube bracket is welded to the tool tube.

3. The agricultural implement of claim 1, wherein the adjustment feature comprises a first elongated slot and a second elongated slot, the tool tube bracket is H-shaped and comprises a first side portion comprising a first pair of upwardly-directed opposing flanges, a second side portion comprising a second pair of upwardly-directed opposing flanges, and a connecting portion that connects the first side portion to the second side portion, the tool tube is positioned between the first pair of upwardly-directed opposing flanges and the second pair of upwardly-directed opposing flanges, the first side portion comprises the first elongated slot, and the second side portion comprises the second elongated slot.

4. The agricultural implement of claim 3, further comprising a first standard bracket coupled to the mounting portion of the standard opposite the tool tube bracket.

5. The agricultural implement of claim 4, wherein the first standard bracket is rectangular.

6. The agricultural implement of claim 4, further comprising a second standard bracket coupled to the first elongated slot of the first side portion opposite the mounting portion of the standard.

7. The agricultural implement of claim 6, wherein a first fastener and a second fastener pass through the first standard bracket, beside the standard, through the first elongated slot, and through the second standard bracket such that the first fastener and the second fastener are in sliding engagement with the first elongated slot when the first and second fasteners are loosened.

8. The agricultural implement of claim 7, wherein a third fastener passes through the standard, through the second elongated slot, and through a washer such that the third fastener is in sliding engagement with the second elongated slot when the third fastener is loosened.

9. The agricultural implement of claim 8, wherein the first and second fasteners are re-positionable in the first elongated slot lengthwise thereof, and the third fastener is re-positionable in the second elongated slot lengthwise thereof.

10. An agricultural implement comprising:
    a coupling mechanism for coupling to a vehicle;
    a frame comprising a tool tube, the tool tube comprising a top, the frame coupled to the coupling mechanism and extending from the coupling mechanism and adapted to be pulled by the vehicle in a direction of travel;
    a plurality of wheel assemblies coupled to the frame, the wheel assemblies supporting the frame above a surface;
    a tool tube bracket comprising an elongated slot, the tool tube bracket coupled to the tool tube; and
    a standard comprising a tool-receiving portion and a mounting portion, a tool coupled to the tool-receiving portion, the mounting portion coupled to the elongated slot for translational adjustment of a position of the standard relative to the tool tube;
    wherein the top of the tool tube, above the tool tube bracket, is exposed.

11. The agricultural implement of claim 10, wherein the tool tube bracket is welded to the frame.

12. The agricultural implement of claim 10, wherein the tool tube bracket is H-shaped and comprises a first side portion comprising a first pair of upwardly-directed opposing flanges, a second side portion comprising a second pair of upwardly-directed opposing flanges, and a connecting portion that connects the first side portion to the second side portion, the tool tube is positioned between the first pair of upwardly-directed opposing flanges and the second pair of upwardly-directed opposing flanges, the first side portion comprises the elongated slot.

13. The agricultural implement of claim 12, further comprising a first standard bracket coupled to the mounting portion of the standard opposite the tool tube bracket.

14. The agricultural implement of claim 13, wherein the first standard bracket is rectangular.

15. The agricultural implement of claim 12, further comprising a second standard bracket coupled to the elongated slot of the first side portion opposite the mounting portion of the standard.

16. The agricultural implement of claim 15, further comprising a first fastener and a second fastener, wherein the first fastener and the second fastener pass through the first standard bracket, beside the standard, through the elongated slot, and through the second standard bracket such that the first fastener and the second fastener are in sliding engagement with the elongated slot when the first and second fasteners are loosened.

17. The agricultural implement of claim 16, further comprising a third fastener that passes through the standard, through the tool tube bracket, and through a washer.

18. An agricultural implement comprising:
a coupling mechanism for coupling to a vehicle;
a frame comprising a tool tube, the tool tube comprising a top, the frame coupled to the coupling mechanism and extending from the coupling mechanism and adapted to be pulled by the vehicle in a direction of travel;
a plurality of wheel assemblies coupled to the frame, the wheel assemblies supporting the frame above a surface;
a tool tube bracket comprising a first elongated slot and a second elongated slot, the tool tube bracket coupled to the tool tube;
a disk gang assembly;
fasteners; and
a standard comprising a mounting portion and a tool-receiving portion, the disk gang assembly coupled to the tool receiving portion, the mounting portion coupled to the first elongated slot with a first fastener of the fasteners and the second elongated slot with a second fastener of the fasteners;
wherein the top of the tool tube, above the tool tube bracket, is exposed.

19. The agricultural implement of claim 18, wherein the tool tube bracket is H-shaped and comprises a first side portion comprising a first pair of upwardly-directed opposing flanges, a second side portion comprising a second pair of upwardly-directed opposing flanges, and a connecting portion that connects the first side portion to the second side portion, the tool tube positioned between the first pair of upwardly-directed opposing flanges and the second pair of upwardly-directed opposing flanges, the first side portion comprises the first elongated slot, and the second side portion comprises the second elongated slot.

20. The agricultural implement of claim 18, further comprising a first standard bracket coupled to the mounting portion of the standard opposite the first elongated slot and the second elongated slot.

\* \* \* \* \*